G. E. GRUNDIG AND S. DIBBINS.
RIM.
APPLICATION FILED OCT. 22, 1921.
1,428,432. Patented Sept. 5, 1922.
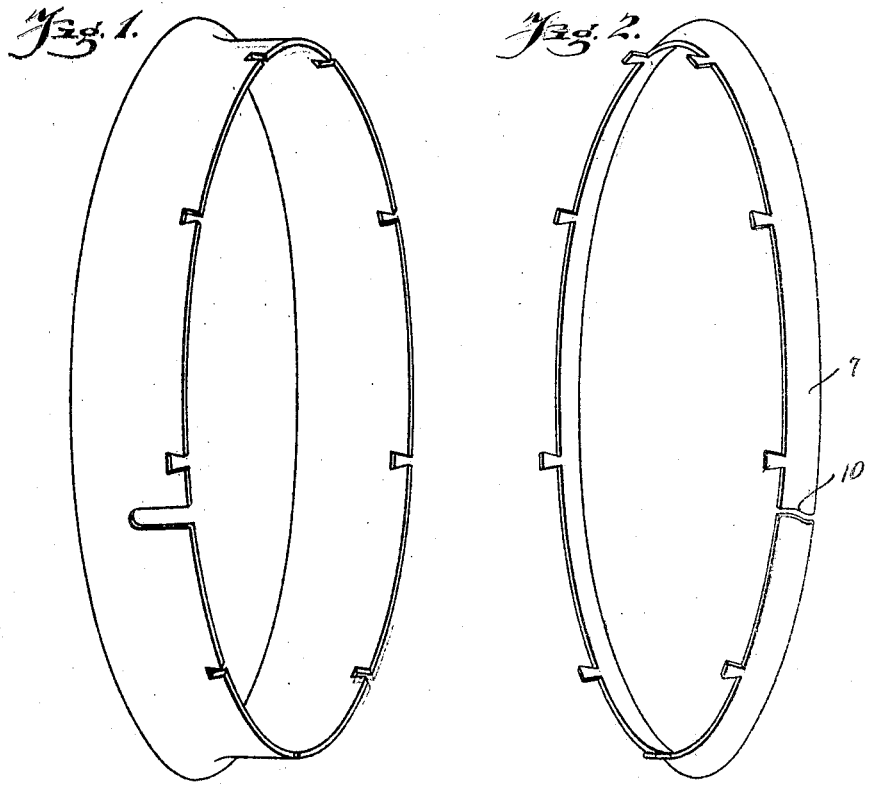
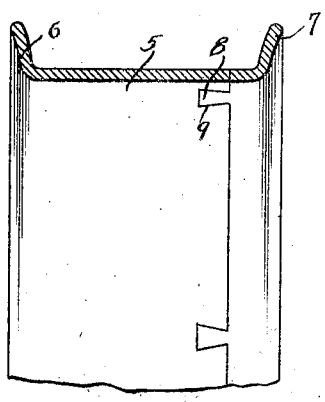
WITNESSES
INVENTORS
G. E. GRUNDIG
S. DIBBINS
ATTORNEYS Patented Sept. 5, 1922.

1,428,432

UNITED STATES PATENT OFFICE.

GEORGE E. GRUNDIG AND SYLVESTER DIBBINS, OF BROOKLYN, NEW YORK.

RIM.

Application filed October 22, 1921. Serial No. 509,464.

*To all whom it may concern:*

Be it known that we, GEORGE E. GRUNDIG and SYLVESTER DIBBINS, both citizens of the United States, and residents of the city of New York, borough of Brooklyn, in the county of Kings and State of New York, have invented a new and Improved Rim, of which the following is a full, clear, and exact description.

The present invention relates to new and useful improvements in wheels and the like, and it pertains more particularly to a demountable rim for pneumatic tires.

It is one of the objects of the present invention to provide a rim for tires in which the tire may be more readily removed from the rim than is the case with rims commonly employed.

It is a further object of the invention to provide a rim with a removable bead in order that when the bead is removed, the tire may be slipped on to the rim without the necessity of stretching, pulling, and the consequent bunching of the inner tube.

It is a further object of the invention to so construct a rim that cumbersome and intricate fastening devices are eliminated.

With the above and other objects in view, reference is had to the accompanying drawings, in which like characters of reference indicate corresponding parts in the several views, and in which Figure 1 is a perspective view of a rim constructed in accordance with the present invention with one of the beads removed therefrom;

Fig. 2 is a perspective view of the removed bead, and

Fig. 3 is a detail sectional view of the rim in assembled form.

Referring more particularly to the drawings, the rim comprises a body portion 5, formed with an integral upstanding bead 6. The reference character 7 designates the opposite bead of the rim, and said bead is provided with a plurality of wedge-shaped or dove-tailed lugs or projections 8.

The body portion 5 of the rim is provided with a plurality of notches or cut-out portions 9 of a shape corresponding to the lugs 8, and said notches or cut-out portions 9 are adapted to receive the lugs 8 when the rim is in assembled position.

As indicated by the reference character 10, the bead 7 is split in order that the same may be distorted in its attachment to and detachment from the body portion 5 of the rim.

The device operates in the following manner:

The bead 7 is removed from the body portion of the rim after which the tire is placed over the body portion 5, this being easily accomplished with the bead section removed, since the inner diameter of the tire is slightly larger than the outer diameter of the body portion 5 of the rim. After this has been done, the lugs 8 of the bead 7 are positioned in their respective notches 9 in the rim and the tire is inflated. As the tire is inflated, the outward pressure within the tire causes the projections 8 of the bead 7 to bind in their respective notches or cut-out portions 9 in the body portion 5 of the rim, and thus secures the removable bead 7 in position.

The notches or cut-out portions 9 are formed with inclined walls which prevent inward distortion of the bead 7 and the tire in its inflated condition prevents outward distortion of the bead 7, and consequently the bead 7 is maintained in inflated condition.

We claim:

A tire rim comprising major and minor sections, the major section being formed along the inner edge thereof with dovetail notches, and dovetail lugs formed along the inner edge of the minor section and snugly received in said notches for holding the opposed edges of the major and minor sections flatly in engagement, said minor section being split whereby the dovetail lugs enter the notches by a radial movement.

GEORGE E. GRUNDIG.
SYLVESTER DIBBINS.